Oct. 2, 1962  B. F. SKINNER  3,056,215
TEACHING AID
Filed Feb. 27, 1961  4 Sheets-Sheet 1
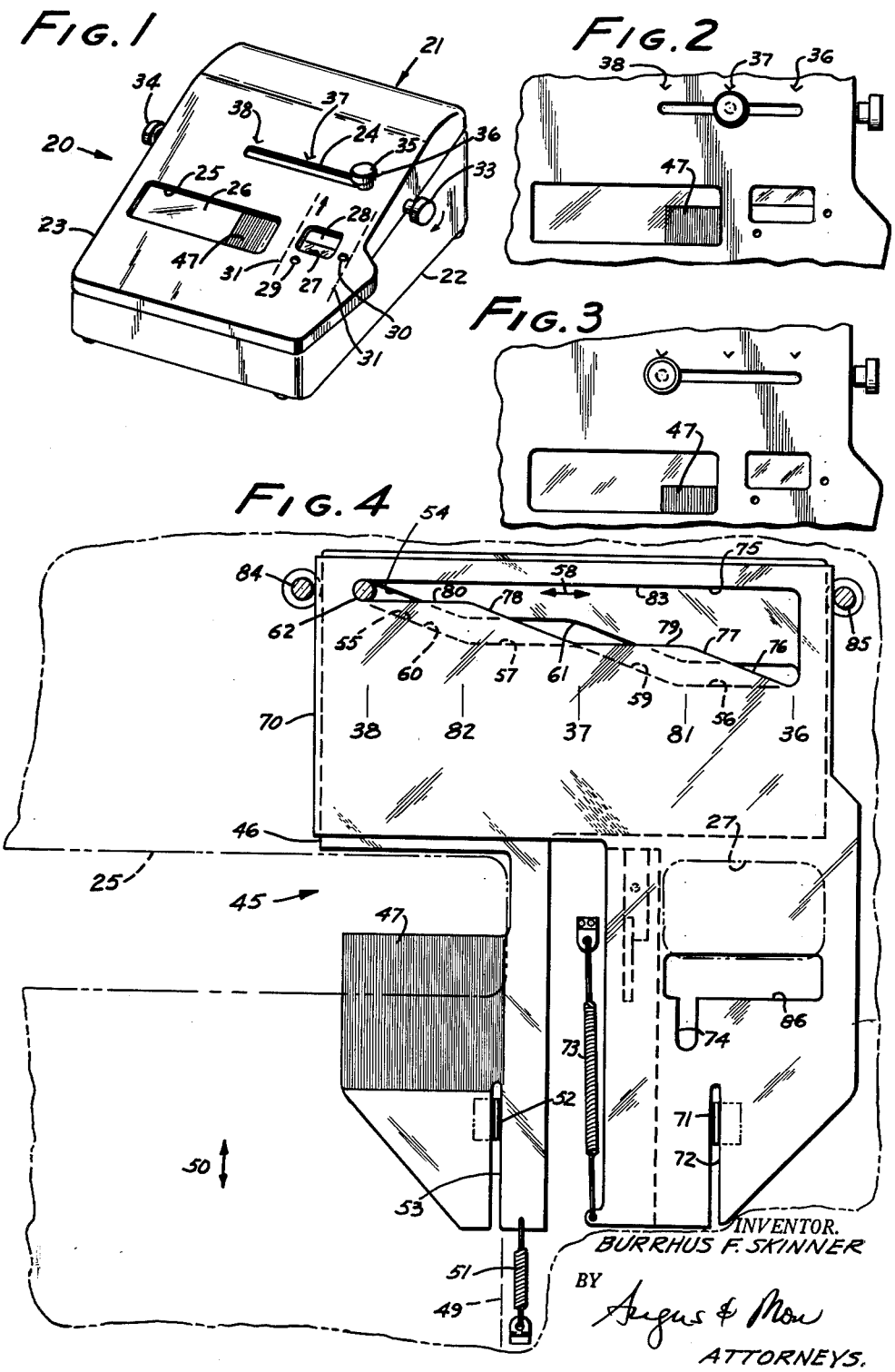
INVENTOR.
BURRHUS F. SKINNER
BY
Angus & Mon
ATTORNEYS.

Oct. 2, 1962     B. F. SKINNER     3,056,215
TEACHING AID
Filed Feb. 27, 1961     4 Sheets-Sheet 2
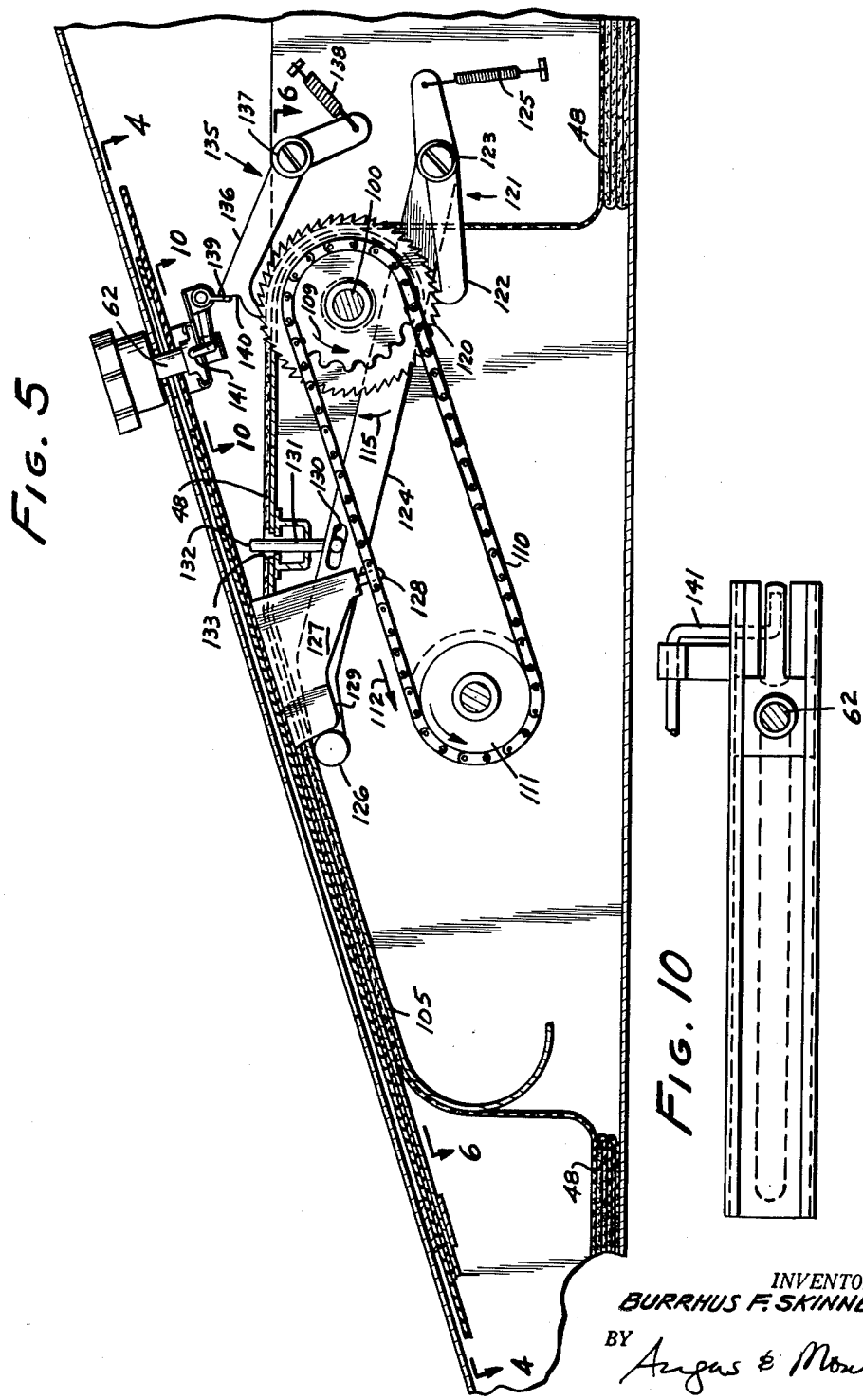
INVENTOR.
BURRHUS F. SKINNER
BY Angus & Mow
ATTORNEYS.

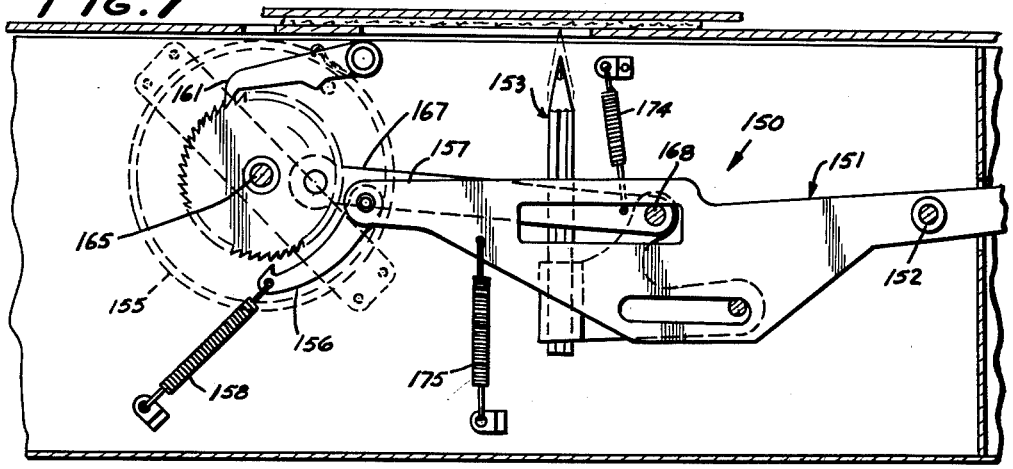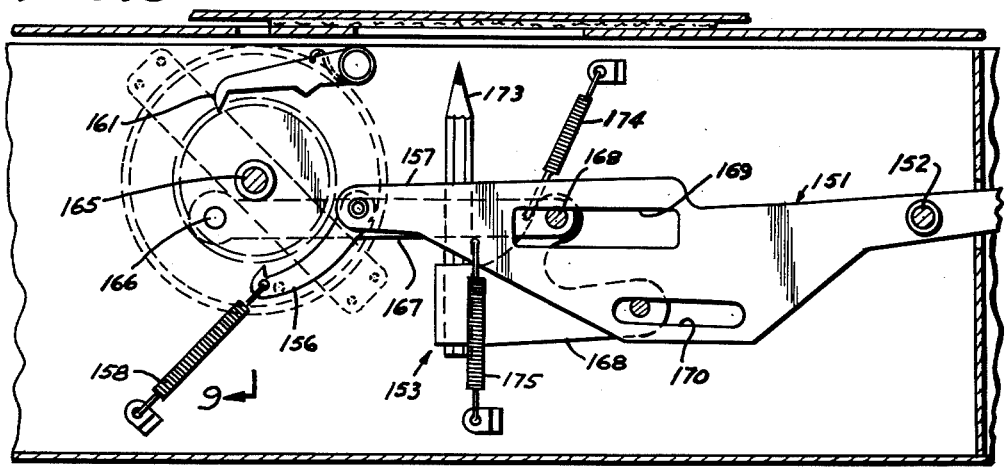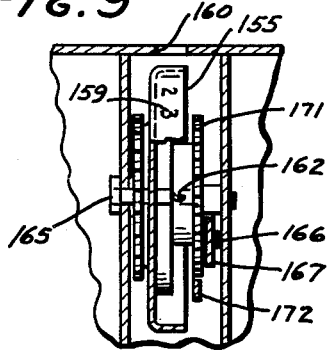

3,056,215
TEACHING AID
Burrhus F. Skinner, Cambridge, Mass., assignor to Rheem Manufacturing Company, New York, N.Y., a corporation of New York
Filed Feb. 27, 1961, Ser. No. 91,943
17 Claims. (Cl. 35—9)

This invention relates to a teaching device for the presentation of programmed instruction material requiring a student's written reply.

Teaching devices are known in which programmed instruction material is presented at one location, while the student is required to compose and write in his answer at another location. These devices are intended to be used by a student without constant personal supervision, and at a rate determined by the individual's own abilities. It follows that the device needs to be proof against cheating, that is, the student ought not to see the instruction material, particularly the answers, prematurely, and he ought not to be able to alter his replies after seeing the answers. Other teaching devices have provided the above functions, and have reasonably well safeguarded against cheating. However, they have not been totally proof against cheating, and furthermore they have been complicated in construction. Others have had to use discs, whose printing is tricky, and whose capacity for instruction material is limited.

A teaching device suitable for use in a schoolroom ought to be proof against cheating, have a large capacity for instruction material, and be simple in construction and operation, these latter to minimize initial cost and later service expense.

Because the same program of instruction material can be used by a large number of students at different times, a teacher who desired to evaluate the program to determine whether the program is unduly difficult in some parts, would have to go through a large number of reply sheets and tabulate the frequency of errors. It is an object of this invention to provide evaluation means actuated by the student when he gives an incorrect reply which mark on the program itself the incidence of a wrong reply to specific questions. Then, when the same program sheet is used by many students, the number of marks on the program enables a direct observation to be made of the occurrence and frequency of wrong answers for the individual questions.

Still another object of this invention is to provide a teaching device which enables the student to have two tries at the correct answer and to receive, between his first and second attempt, either a hint which will enable him to be more certain of a correct answer on the second try, or information permitting him to infer that his first answer was wrong without offering further help toward a correct answer. A related object is to protect the response given on both tries from later alteration. A record is then kept of both tries, which is, of course, indicative both of the student's abilities, and of the efficacy of the hints.

A teaching device according to this invention includes a case that has a window for displaying instruction material, and an opening that gives a student access to a writing surface beneath the opening so that the student can write a response to the instruction material thereon. Means are provided for controlling viewing of the instruction material and access to the writing surface which include a masking sheet and a shield sheet that are adapted to be moved by cam means. The masking sheet includes an opaque region that is adapted to overlay at least a portion of the instruction material in the window in a first position and to stand away from said portion in a second position, thereby controlling viewing of the instruction material.

The shield sheet has an aperture therethrough which is adapted to overlay an area of the writing surface in a first position of the shield sheet, enabling the student to write on said area at that time. It is further adapted to stand away from said area in a second shield sheet position so that an imperforate part of the shield sheet overlays the said area to deny the student access thereto. The cam means determines the position assumed by the two sheets and is arranged so that after the student has had an opportunity to write in his response, access to his response is denied to him before further instruction means is made available.

According to a preferred but optional feature of the invention, a cam slot is provided in each of said sheets to uniquely determine the position of the sheet so that a cam, which rides in said slot, determines the position of said sheets.

According to another preferred but optional feature of the invention, there is provided an evaluation device for concurrently checking a student's response to an instruction program and determining the frequency of errors in responding to individual questions in said program, said evaluation means including marking means for applying a mark to the program in proximity to an incorrectly answered question.

FIG. 1 is a perspective view of the presently preferred embodiment of the invention;

FIGS. 2 and 3 are top views of a portion of FIG. 1 in two sequential operative positions;

FIG. 4 is a cross-section taken at line 4—4 of FIG. 5, showing the device of FIG. 1 is still another operative position;

FIG. 5 is a cross-section taken at line 5—5 of FIG. 6;

FIGS. 7 and 8 are side elevations of the evaluation means of the invention;

FIG. 9 is a cross-section taken at line 9—9 of FIG. 8; and

FIG. 10 is a fragmentary cross-section taken at line 10—10 of FIG. 5.

Figure 6:
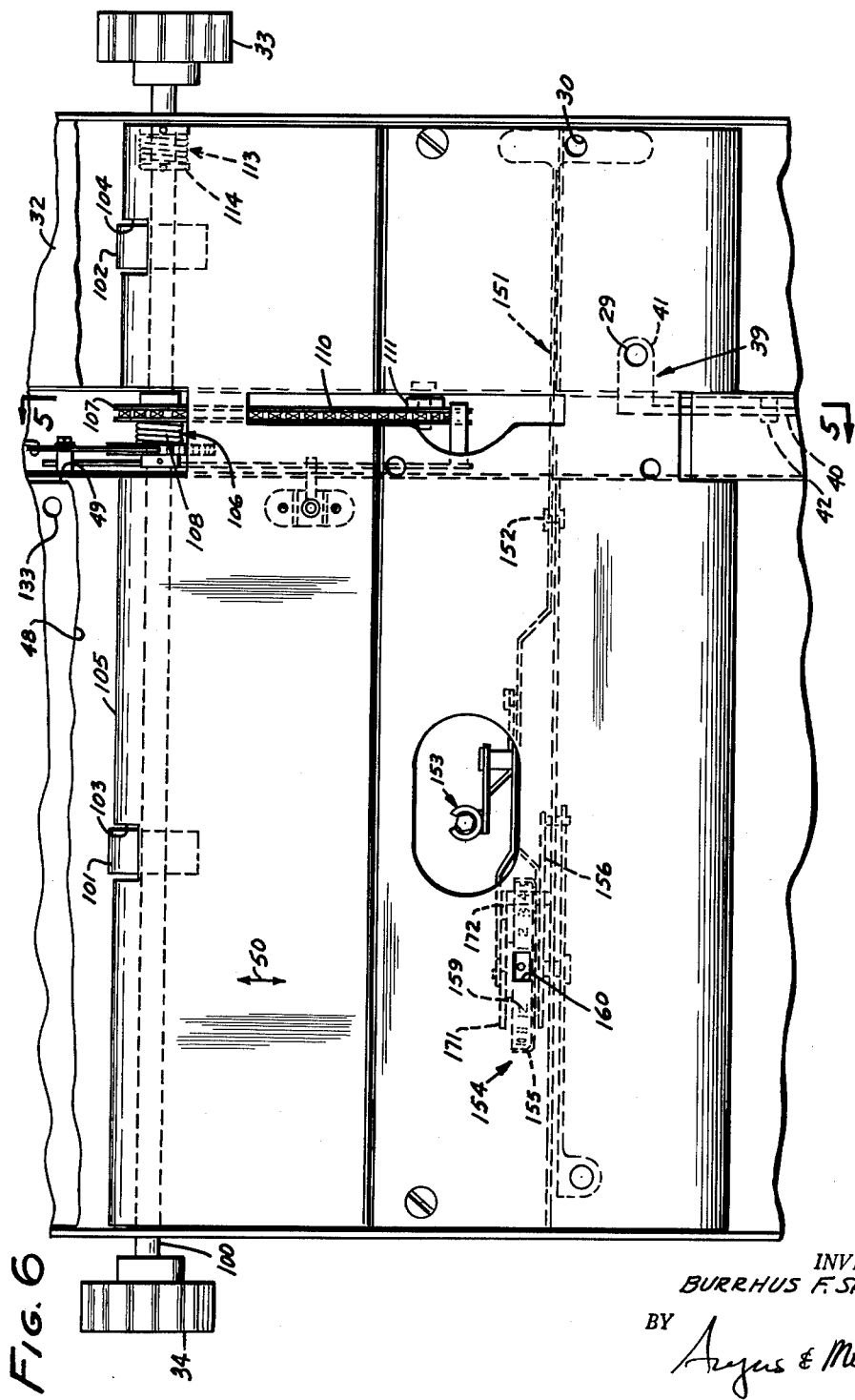
FIG. 6 is a cross-section taken at line 6—6 of FIG. 5.

FIG. 1 shows the presently preferred embodiment of a teaching device 20 according to the invention. This device includes a case 21 with a bottom section 22 and a lid 23 hinged at its upper edge to the bottom section. The lid of the case includes a cam guide slot 24, and a window 25 with a transparent pane 26 therein for display of instruction material beneath the pane. The lid also includes an opening 27 which gives access to a writing surface 28 inside the case.

A case latch opening 29 is formed in the case below and adjacent to the left edge of opening 27. An evaluation opening 30 is formed to the right of opening 27. Dotted lines 31 indicate the lateral expanse of a strip 32 of paper which includes the writing surface 28. Openings 29 and 30 overlay this strip 32 so that any manipulation of mechanisms below openings 29 and 30 will be indicated by punches or marks on the strip.

Knobs 33 and 34 are provided outside the case for connection with mechanism for advancing the instruction material and writing surfaces as will later be described.

Cam knob 35 projects above the cam guide slot to give the student means for moving elements yet to be described. Reference marks 36, 37, 38 are provided along the cam guide slot indicating a first position, a second position, and a final position, respectively. These positions relate to the cam position and also to the resulting sheet positions.

A case latch mechanism 39 is best shown in FIG. 6. It includes a lever 40 with a flange 41. The flange underlies case latch opening 29. The lever is pivotally mounted by pin 42. The end of the lever on the other side of the pin from the flange forms a hook-type engagement (not shown) with the lid of the case. Pressing flange 41 downwardly will release the catch and permit the lid to be raised. When the flange is up, the lever locks the lid. It will be noted that strip 32 lies between opening 29 and flange 41 so that pressing the flange through the paper will leave a punch in or a mark on the paper, indicating to the teacher that the case has been opened, thereby invalidating the test. This feature bars the student from unauthorized access to the program material.

It is an object of this invention to provide instruction material at window 25 to which the student composes a response and enters it on the writing surface beneath opening 27. Evidently it is necessary to provide controlled access to the instruction material and to the writing surface so that the student cannot prematurely see the instruction material and cannot change his responses later. It is also an object of this particular device to provide intermediate steps, whereby the student may be given hints or additional instruction material.

FIG. 4 illustrates mechanism for carrying out these objectives which includes means 45 for controlling viewing of the instruction material and access to the writing surface. These means include a metal or plastic masking sheet 46 having an opaque region 47. As can be seen in FIG. 4, opaque region 47 is adapted to overlay at least a portion of instruction material in the window in a first position of the masking sheet (the first position is shown in FIG. 1) and to stand away from that portion in a second position (shown in FIG. 2). The instruction material 48 is preferably provided on a continuous roll or manifolded packet as best shown in FIG. 6. Its right hand margin 49 is shown in FIG. 4. The masking sheet is movable longitudinally of the direction of movement of the instruction material, which direction is indicated by arrow 50 in FIG. 4. The masking sheet is biased in a downward direction (toward the bottom of FIG. 4) by spring 51 and is guided by guide 52 riding in guideway 53 formed in the masking sheet.

The masking sheet includes a cam slot 54 which has a cam surface 55, the cam surface having first and second hold segments 56, 57 which lie parallel to the direction of cam movement indicated by arrow 58. Cam surface 55 also has first and second actuator segments 59, 60, which lie at an angle to the direction of cam movement. The wall 61 of the cam slot opposite cam surface 55 has surfaces parallel to segments 56, 57, 59, 60. It will be observed that as the cam 62 moves to the left and right in FIG. 4, the masking sheet will be held stationary while the cam rides along the hold segments and will be actuated in an upward or downward direction relative to arrow 50 when the cam rides the actuator segments. This, in turn, will move the opaque region 47 to the positions indicated in FIGS. 1–3. In FIG. 1, the opaque region completely overlays a portion of the instruction material. (This is the first position.) At the second position of the cam shown in FIG. 2, the opaque region has been moved down, uncovering at least a portion of the instruction material, which might be for such a purpose as giving the student a hint or further instruction. In the final position of the cam shown in FIG. 3, the opaque region has been moved down still farther (to its final position), perhaps for the purpose of showing the student the final answer. It will be observed that the position of the masking sheet is uniquely determined by the cam position, and cannot be juggled by the student.

Concurrent control of access to the writing surface beneath opening 27 is provided by a transparent shield sheet 70 (FIG. 4). This sheet is guided in the longitudinal direction of arrow 50 by a guide 71 riding in a guideway 72 in the shield sheet. The shield sheet is biased upwardly in FIG. 4 by tension spring 73 connected between the sheet and the case. There is a slot 74 in the shield sheet giving access to the case latch flange 41 in all positions of the shield sheet. The shield sheet is intended to be moved up and down to shift an aperture 86 relative to the opening in the case to give access to the writing surface which is coordinated with the presentation of the instruction material.

To move the shield sheet as aforesaid, the shield sheet is provided with a cam slot 75 within which the cam rides. The cam slot includes a cam surface 76, having first and second actuator segments 77, 78, and first and second hold segments 79, 80. It will be noted that the actuator and the hold segments of the masking sheet and the shield sheet are staggered as shown in FIG. 4. For convenience in discussion, the first, second and final positions of the cam are illustrated by reference marks 36, 37, and 38, which are V-shaped, their apexes indicating the respective cam positions. Cross-over points 81 and 82 are similarly shown.

Cam slot 75 also includes an opposite wall 83, which is opposite to cam surface 76. It lies parallel to the direction of cam movement.

Both sheets are guided in their parallel movement by rollers 84, 85.

The coordinated nature of the movement of the two sheets can be understood at this point by examination of FIG. 4. When the cam is moved entirely to the right, it will be seen that the cam slot of the masking sheet will have moved the masking sheet to the uppermost (first) position illustrated in FIG. 1 and that the spring 73 will have biased the shield sheet to its uppermost position (first) also illustrated in FIG. 1. At this point, instruction material will be presented to the student and he can compose a response and write it through the aperture in a position shown in FIG. 1. Movement of the cam from position 36 to cross-over point 81 will leave the masking sheet held in its initial position because the cam rides along a hold segment. During this time, the cam has ridden along actuator segment 77 of the shield sheet, moving the shield sheet to the lower (second) position shown in FIG. 2.

As the cam moves from position 81 to position 37, it rides along hold segment 79 of the shield sheet and along actuator segment 59 of the masking sheet, thereby holding the shield sheet in the position shown in FIG. 2 and moving the opaque region to the (second) position also shown in FIG. 2.

Movement of the cam from position 37 to cross-over point 82 causes the cam to move along hold segment 57 of the masking sheet and actuator segment 78 of the shield sheet, thereby moving the aperture to the position illustrated in both FIGS. 3 and 4, while holding the masking sheet in its previous position. Moving the cam from point 82 to final position 38 causes the cam to ride along hold segment 80 of the shield sheet and actuator segment 60 of the masking sheet, thereby moving the masking sheet to the position shown in FIGS. 3 and 4. It will thus be seen that the previous area exposed to the student for response is always covered by an imperforate region of the shield sheet before further instructional material is uncovered. This is accomplished by means of sheet movements before and after the cam passes cross-over points 81 and 82.

The above mechanism provides for the regulation of exposure of an individual piece of instruction material and an individual area on strip 32. There now remains to be disclosed the means for controlling sequential presentation of the instruction material and other areas on strip 32 so that new questions and answers are presented to the student in such a manner that he does not get to see them prematurely and cannot change his previous answers. This mechanism is best shown in FIGS. 5 and 6 to which reference should now be made.

A shaft 100 is journaled in the case and carries at both of its ends knobs 33 and 34. The shaft carries friction wheels 101, 102, which engage the bottom surface of the instruction material 48 and strip 32, respectively. Opposed pressure rollers (not shown) can be journaled to the lid to apply opposing pressure on the material and strip so that turning the shaft and the wheels will advance them in the direction of arrow 50. Wheels 101 and 102 project through notches 103, 104, respectively, in a support 105 which extends across the case to back up the instruction material and to provide a supporting surface for the response strip 32 so that a student can write on it. Other notches which are shown in the drawing are formed to give additional access through the support where needed.

The shaft carries a first unidirectional drive 106 which comprises a gear 107 spindled on the shaft with a light friction fit, and coupled to the shaft through a spring clutch 108 which permits free rotation of the gear 107 in the counter-clockwise direction shown by arrow 109. This would also be the driving direction of the clutch. However, this gear is never driven in the driving direction. The function of the first unidirectional drive is to permit slippage in that direction. This enables an endless chain 110 which extends over a sprocket wheel 111 to move freely in the direction shown by arrow 112. But the chain is locked against movement in a direction contrary to arrow 112 except when the shaft is turned clockwise in FIG. 5, at which time it turns with the shaft.

A second unidirectional drive 113 is placed between the case and the shaft. It comprises a spring clutch 114 which permits rotation of the shaft only in the clockwise direction in FIG. 5 illustrated by arrow 115. The shaft cannot be turned counter-clockwise under any circumstances.

A ratchet wheel 120 is pinned to the shaft, so it turns with the shaft. This ratchet wheel serves as means to lock the shaft against rotation except upon the concurrent release of a pair of release means. A first release element 121 includes a pawl 122 which pawl permits counter-clockwise movement of the ratchet wheel, but restrains clockwise movement of it. This pawl is pivotally mounted by a pin 123 to a lever 124. The lever is pivotally pin-mounted to the case. The lever and the pawl are biased by spring 125 toward a locking position of the pawl.

Lever 124 has a finger 126 which stands in the path of a projection 127 on the bottom surface of the shield sheet. This projection also includes a pin 128 which is adapted to engage in, and remain in engagement with, endless chain 110 so that the shield sheet is free to move in the direction of arrow 112 in FIG. 5 independently of shaft 100. It cannot return the other way unless the shaft is released for rotation and turned.

Projection 127 has a cam surface 129 which, when moved to the left in FIG. 5, can depress finger 126 to release pawl 122.

The first release element additionally includes a slot 130 in lever 124 in which one end of an L-shaped post 131 projects. Up and down movement of the lever moves the post up and down. Arm 132 of the post projects upwardly and is adapted to enter index holes 133 in the instruction material. The instruction material is provided with one of these index holes for each of the questions, the index hole overlaying arm 132 when the instruction material is properly positioned in the window. The bias of spring 125 will move lever 124 and post 131 in an upward direction so that it will project through the hole, except when the lever is held down by projection 127. When finger 126 is depressed, post 131 will also drop, permitting the instruction material to be moved and overlay it. The contact of the instruction material with the top of the post will hold down the arm of lever 124 even against the bias of spring 126, and hold pawl 122 disengaged until an index hole again overlays the post.

A second release element 135 includes a pawl 136 which also permits ratchet wheel 120 to rotate freely in a counter-clockwise direction, but which locks it against clockwise direction unless the pawl is released. The pawl is mounted to a pin 137 and biased to its locking position by spring 138. It is releasable by movement of a finger 139 (FIGS. 5 and 10). The finger is adapted to bear against a shoulder 140 on the pawl to raise it off the ratchet wheel when an arm 141, of which the finger is a portion, is contacted by the cam when in its first position (position 36).

The shaft 100 is locked until the shield sheet is moved to the final position at which the shield sheet remains even when the cam is moved back to the first position because of the interengagement between pin 128 and chain 110. Spring 51 is not strong enough to overcome the friction force between gear 107 and the shaft. Therefore return of the shield sheet awaits turning of shaft 100. Return of the cam to its first position will have returned the opaque region of the masking sheet to the position shown in FIG. 1. Thus the answer portion of the instruction material is covered before new instruction material can be moved to the window, and the previous answer is kept completely shielded.

At the above cam position, the two release elements are concurrently released. The shaft can be turned by turning the knobs, which will cause gear 107 to be turned in a clockwise direction (opposite arrow 109). This permits the shaft to turn the chain, working with spring 73, to pull up the shield sheet along with the advancing reply strip 32. During the initial part of the movement of the instruction material, the index hole moves away from end 132 and an imperforate portion of the answer sheet holds down the post (projection 127 will have moved off finger 126). Accordingly, the post keeps the first release element released until the next index hole reaches it, at which time the end of the post rises through the hole, again permitting the pawl to engage with the ratchet wheel. The shaft is again locked in position until another cycle of actuation of the cam is completed.

In the use of programs of instruction material, it is important to know what answers, and how many of the answers an individual student misses. This, of course, is something to be marked on the individual student's own response sheet, which is accomplished in the disclosed device. In addition, it is also desirable to determine whether or not any particular question is being missed by too many students, for that would tend to indicate that the program is either too difficult or not sufficiently instructive at this point. Were the only record of answers missed to be those contained on the individual student's answer sheets, the teacher would have a very burdensome job of tabulating errors. An evaluation means in this invention provides a means for tabulating directly on the program the answers which are missed and the frequency of the misses.

Evaluation means 150 are best shown in FIGS. 6-9 to which reference should now be had. In FIG. 6, there is shown an evaluation lever 151 which underlies evaluation opening 30 and stands beneath the strip 32. When a student records an incorrect response to the question, it is intended for him to take his pencil and push down through the evaluation opening. This will either make a mark or puncture the strip, giving an indication of an incorrect answer and depressing the evaluation lever. This lever is attached to the case at fulcrum 152 (see FIGS. 7 and 8). It has for its object the manipulation of marking means 153 and a counter 154.

The counter includes a counting wheel 155 which is journaled to the case and actuated by a pawl 156 carried on an arm 157 of evaluation lever 151. The pawl is biased free of the counting wheel by a spring 158. Pressing the right-hand end of evaluation lever 151 downwardly will raise arm 157 to engage the pawl and wheel to move the counting wheel one unit.

The counting wheel is best shown in FIG. 9. It has numerals 159 on its outside periphery which are visible through an opening 160 to indicate the number of incorrect answers. A reset pawl 161 is provided, that is directed oppositely to pawl 156. The counting wheel has an internal clock spring 162 which winds up as the wheel is turned by pawl 156. Resetting is attained by lifting the reset pawl, permitting the clock spring to unwind and reset the counting wheel.

A bell crank 166 is mounted to the same shaft 165 as the counting wheel. The bell crank is rotatable independently of the counting wheel. The bell crank is in the shape of a disc. An arm 167 has one of its ends pinned to the disc away from the center of rotation. The arm is thereby rendered reciprocable by rotation of the bell crank. The other end of the arm is mounted to a guide 168, which guide is slidably mounted in slots 169, 170 in the evaluation lever. The disc is formed with ratchet teeth 171 engageable by pawl 172. The pawl is actuated by depression of the right-hand end of the evaluation lever.

The guide carries marking means 153 which, as illustrated, may be such as a pencil 173. A spring 174 biases the marking means to the right against the action of the bell crank. A spring 175 biases arm 157 in a downward direction to hold the right-hand end of the evaluation lever in its uppermost position.

The operation of the evaluation means will be evident from FIG. 7. Pushing the right-hand end of the evaluation lever down will make a mark either on or through the answer strip 32 and will lift the left-hand arm 157 of the evaluation lever. This will cause pawl 156 to turn the counting wheel by one unit. It will also cause pawl 172 (see FIG. 6) to rotate the bell crank by one unit. The marking means is moved up against the bottom of the instruction material to make a mark thereon, indicating that an incorrect answer has been rendered. It also adds to the count on the counter-wheel. In addition, rotation of the bell crank moves the marking means laterally relative to the instruction material, so that the next marking is along a different longitudinal line. It will be appreciated that were the marking means not reciprocable from side to side, then it might be that even though a number of incorrect replies were made to the same answer, all the markings might be applied to the same point and an accurate count could not then be made. With this device, the markings are scattered at random across the back of the individual portions of instructional material and can therefore provide an accurate count. It would be quite unusual for the marking means to apply a marking twice exactly to the same point with this device.

The operation of the machine should be evident from the above description of its structure and only a short recapitulation will be given at this point. With reference to FIGS. 1–4, the student first encounters the machine set as in FIG. 1 with the lid down and locked, with the aperture in the shield sheet at the upper portion of the opening, and with the opaque portion of the masking sheet covering part, but not all, of the instruction material. At this time, the student writes in his response to the exposed material.

Next, he moves the cam from its first to its second position, that is, from position 36 to 37. The result of this movement is an initial shift of the shield sheet to position shown in FIG. 2, because of the contact between actuator segment 77 and the cam. This exposes an area for an additional response and shields the first response against alteration. The opaque material continues to keep covered a portion of the instruction material. After cross-over point 81 is reached, the shield sheet remains locked in position, and contact of the cam with actuator segment 59 moves down the masking sheet to expose another portion of instruction material. This might be such as a hint or further instruction material or even another question. The student now enters his reply on the newly exposed writing surface.

Next, the student moves the cam from second position 37 toward the final position 38 during which time the first movement, caused by contact between the cam and actuator segment 78, until cross-over point 82 is reached, is of the shield sheet to the position shown in FIGS. 3 and 4, wherein an imperforate portion of the shield sheet entirely overlays all portions of the writing surface beneath the opening. During this initial cam movement, the masking sheet was held still because of contact between the cam and hold segment 57. After passing cross-over point 82, the shield sheet is held in position because of contact between the cam and hold segment 80 while the cam contacts actuator segment 60 to move the masking sheet to the position shown in FIG. 3 which exposes more of the instruction material, which might for example be the correct answer.

This ends the question and answer cycle, and the student now returns the cam to the first position (position 36). This causes the cam to contact the second release element 135, moving finger 139 against shoulder 140, and releasing pawl 136. Pawl 136 will then stand clear of the ratchet wheel so long as the cam remains in that position. Also at this time, projection 127 on the shield sheet will have depressed finger 126 on lever 124 of the first release element 121. This releases pawl 122 and also lowers post 131. The shaft can now be turned clockwise relative to FIG. 5 to advance both the instruction material and the answer strip. Spring 73, together with the friction between the shaft and gear 107, provides enough force to cause the shield sheet to return to the right in FIG. 5, when the shaft is turned. The gear, sprocket wheel, and endless chain all turn and advance together. The engagement of finger 126 in the chain keeps movement of the shield sheet coordinated with movement of the response strip, because both the chain and the strip are driven by the same shaft. Pawl 122 remains disengaged because an imperforate portion of the instruction material stands above post 131. The shaft is turned until an index hole on the instruction material stands above the post, at which time the post springs back to the position illustrated in FIG. 5, thereby re-engaging pawl 122 to ratchet wheel 120, and stopping rotation of the shaft. This is a signal that the instruction material is necessarily properly centered in the window.

Note that during the time the shield sheet was advanced with the endless chain, the answer strip also advanced so that an imperforate portion of the shield sheet always overlaid the previous answer on the answer strip, and the responses could not be altered. The response cycle is now repeated, it being noted that as the cam is moved to the left in FIG. 1, the second release means 135 again drops the pawl onto the ratchet wheel so that the shaft cannot again be turned.

The above-described construction provides an invariable interlock between the answer material and the instruction material, such that there is no possibility of cheating or circumventing the technique defined by the mechanism. Operation of the mechanism requires no skill on the part of the student. The construction of the machine is quite simple, considering the results attained by the mere manipulation of a cam knob and a shaft handle.

In the event that only a question and answer cycle is desired, without a hint step, the cam could be moved directly from position 36 to position 38. Also, the cam surfaces could be simplified to provide only one hold and one actuator segment, arranged as the segments are between positions 36 and 37, the other structure being modified as necessary. Also, more steps could be provided, simply by increasing the number of cam segments.

This invention is not to be limited by the examples shown in the drawings and described in the description which is given by way of example and not of limitation, but only in accordance with the scope of the appended claims.

I claim:
1. In a teaching device having a case with a window for display of instruction material and an opening giving access to a writing surface beneath the opening on which a student can write a response to the material displayed in the window, means for controlling viewing of the instruction material and access to the writing surface, comprising: a masking sheet in said case having an opaque region adapted to overlay at least a portion of the instruction material in the window in a first position of the masking sheet, and to stand away from said portion in a second position so that the portion can be seen through the window; a shield sheet having an aperture therethrough which is adapted to overlay an area of said writing surface in a first position of the shield sheet to enable the student to write on said area, and to stand away from said area in a second position so that an imperforate part of the shield sheet overlays the said area to deny the student access to said area; a cam surface on each of said sheets, the sheets overlaying each other at their cam surfaces and being adapted to slide in parallel paths; a cam mounted to said case and in simultaneous engagement with both cam surfaces; an actuator segment on each cam surface which lies at an angle to the direction of movement of the cam; a hold segment on each cam surface which lies parallel to the direction of movement of the cam; the hold and actuator segments of the two sheets being alternately arranged, so that the cam contacts a hold segment of one sheet and an actuator segment of the other to alternately actuate and hold the two sheets, a hold segment on the masking sheet and an actuator segment on the shield sheet being contacted by the cam in its initial position with the sheets in their first positions, initial movement of the cam moving the shield sheet to its second position while holding the masking sheet in its first position, whereupon the cam engages an actuator segment on the masking sheet and a hold segment on the shield sheet to move the masking sheet to its first position while holding the shield sheet in its second position.

2. A teaching device according to claim 1 in which the cam surface in the masking sheet forms one wall of a cam slot, the opposite wall extending parallel to the cam surface, and being laterally spaced therefrom by a distance substantially equal to the thickness of the cam, whereby the position of the masking sheet is solely determined by the cam.

3. A teaching device according to claim 1 in which the cam surface in the shield sheet forms one wall of a cam slot, the opposite wall extending parallel to the direction of cam movement, whereby the shield sheet is actuated by the cam in one direction of cam movement, and is independent of the cam in the opposite direction, and in which a unidirectional means is engaged to said shield sheet to permit its movement in said one direction, and to prevent its movement unless the unidirectional means is released.

4. A teaching device according to claim 3 in which the cam surface in the masking sheet forms one wall of a cam slot, the opposite wall extending parallel to the cam surface, and being laterally spaced therefrom by a distance substantially equal to the thickness of the cam, whereby the position of the masking sheet is solely determined by the cam.

5. A teaching device according to claim 4 in which release means are provided for releasing the unidirectional movement means, comprising a first element actuable by the shield sheet in its second position, and a second element actuable by the cam in its initial position, said elements, when so actuated, releasing the unidirectional means and permitting the shield sheet to be returned to its first position.

6. A teaching device according to claim 5 in which the instruction material is adapted to be moved past the window, and has an index hole and an imperforate portion on a path aligned with its direction of movement, the first element of the release means including a lever in said path adapted to enter said index hole when the index hole overlays the lever, and to be restrained by the imperforate portion when overlaid by it, the first element being actuated by said contact of the imperforate portion with the lever.

7. A teaching device according to claim 5 in which said unidirectional movement means and the writing surface are coupled to a shaft, whereby turning the shaft when permitting by actuation of the elements simultaneously advances the writing surface and the shield sheet, thereby presenting a new writing surface beneath the aperture while shielding the previous writing surface.

8. A teaching device according to claim 7 in which the unidirectional movement means comprises a first unidirectional drive engaged to said shaft, and engagement means connected to said shield sheet and to said first unidirectional drive, actuation of the sheet pulling said engagement means with it, said movement being permitted by the first unidirectional drive, and in which a second unidirectional drive is connected between the shaft and the case, the rotatability of said drives being opposite from each other; concurrent release of the first elements enabling the shaft to be turned to move the engagement means, and thereby the shield sheet, to return the shield sheet to its first position.

9. A teaching machine according to claim 8 in which the first unidirectional drive comprises an endless chain, an idler sprocket mounted to the case, and a drive gear mounted to said shaft for unidirectional rotary movement relative to the shaft.

10. In a teaching device having a case with a window for display of instruction material and an opening giving access to a writing surface beneath the opening on which a student can write a response to the material displayed in the window, means for controlling viewing of the instruction material and access to the writing surface, comprising: a masking sheet in said case having an opaque region adapted to overlay at least a portion of the instruction material in the window in a first position of the masking sheet, and to stand away from said portion in a second position so that the portion can be seen through the window; a shield sheet having an aperture therethrough which is adapted to overlay an area of said writing surface in a first position of the shield sheet to enable the student to write on said area, and to stand away from said area in a second position so that an imperforate part of the shield sheet overlays the said area to deny the student access to said area; a cam surface on each of said sheets, the sheets overlaying each other at their cam surfaces and being adapted to slide in parallel paths; a cam mounted to said case and in simultaneous engagement with both cam surfaces; a plurality of actuator segments on each cam surface which lie at an angle to the direction of movement of the cam; a plurality of hold segments on each cam surface which lie parallel to the direction of movement of the cam; the hold and actuator segments of each cam surface being arranged alternately, the hold and actuator segments of the two sheets being alternately arranged, so that the cam contacts a hold segment of one sheet and an actuator segment of the other to alternately actuate and hold the two sheets, a hold segment on the masking sheet and an actuator segment on the shield sheet being contacted by the cam in its initial position with the sheets in their first positions, initial movement of the cam moving the shield sheet to its second position while holding the masking sheet in its first position, whereafter the cam engages an actuator segment on the masking sheet and a hold segment on the shield sheet to move the masking sheet to its second position while holding the shield sheet in its second position, further movement of the cam causing the cam to engage a hold segment on the masking sheet and an actuator segment on the shield sheet to move the shield sheet to a final position while holding the masking sheet in its second position, whereafter the cam engages an actuator segment on the masking sheet to move it to a final position while holding the shield sheet in its final position.

11. A teaching device according to claim 10 in which the cam surface in the masking sheet forms one wall of a cam slot, the opposite wall extending parallel to the cam surface, and being laterally spaced therefrom by a distance substantially equal to the thickness of the cam, whereby the position of the masking sheet is solely determined by the cam.

12. A teaching device according to claim 10 in which the cam surface in the shield sheet forms one wall of a cam slot, the opposite wall extending parallel to the direction of cam movement, whereby the shield sheet is actuated by the cam in one direction of cam movement, and is independent of the cam in the opposite direction, and in which a unidirectional means is engaged to said shield sheet to permit its movement in said one direction, and to prevent its movement unless the unidirectional means is released.

13. A teaching device according to claim 12 in which the cam surface in the masking sheet forms one wall of a cam slot, the opposite wall extending parallel to the cam surface, and being laterally spaced therefrom by a distance substantially equal to the thickness of the cam, whereby the position of the masking sheet is solely determined by the cam.

14. A teaching device according to claim 13 in which the case includes a lid and a latch mechanism, said mechanism comprising a lever with a poriton lying beneath a surface contactible by the student and enabling the lever to be pressed to release the latch mechanism and open the case, the surface having the quality of indicating that such contact has been made.

15. A teaching device according to claim 14 in which said surface is the writing surface.

16. In a teaching device having a case with a window for display of instruction material and an opening giving access to a writing surface beneath the opening on which a student can write a response to the material displayed in the window, means for controlling viewing of the instruction material and access to the writing surface, comprising: a masking sheet in said case having an opaque region adapted to overlay at least a portion of the instruction material in the window in a first position of the masking sheet, and to stand away from said portion in a second position so that the portion can be seen through the window; a shield sheet having an aperture therethrough which is adapted to overlay an area of said writing surface in a first position of the shield sheet to enable the student to write on said area, and to stand away from said area in a second position so that an imperforate part of the shield sheet overlays the said area to deny the student access to said area; a cam surface on each of said sheets, the sheets overlaying each other at their cam surfaces and being adapted to slide in parallel paths; a cam mounted to said case and in simultaneous engagement with both cam surfaces; an actuator segment on each cam surface which lies at an angle to the direction of movement of the cam; a hold segment on each cam surface which lies parallel to the direction of movement of the cam; the hold and actuator segments of the two sheets being alternately arranged, so that the cam contacts a hold segment of one sheet and an actuator segment of the other to alternately actuate and hold the two sheets, a hold segment on the masking sheet and an actuator segment on the shield sheet being contacted by the cam in its initial position with the sheets in their first positions, initial movement of the cam moving the shield sheet to its second position while holding the masking sheet in its first position, whereupon the cam engages an actuator segment on the masking sheet and a hold segment on the shield sheet to move the masking sheet to its first position while holding the shield sheet in its second position, and an evaluation device in said case for concurrently checking a student's responses to the instruction material and determining the frequency of his errors, comprising: a lever actuable by the student when he makes an incorrect response; a counter connected to and actuated by said lever to count total lever actuations; and marking means connected to and actuated by said lever, said marking means being so disposed and arranged as to apply a mark on the instruction material in proximity to an incorrectly-answered question.

17. In a teaching device having a case with a window for display of instruction material and an opening giving access to a writing surface beneath the opening on which a student can write a response to the material displayed in the window, means for controlling viewing of the instruction material and access to the writing surface, comprising: a masking sheet in said case having an opaque region adapted to overlay at least a portion of the instruction material in the window in a first position of the masking sheet, and to stand away from said portion in a second position so that the portion can be seen through the window; a shield sheet having an aperture therethrough which is adapted to overlay an area of said writing surface in a first position of the shield sheet to enable the student to write on said area, and to stand away from said area in a second position so that an imperforate part of the shield sheet overlays the said area to deny the student access to said area; a cam surface on each of said sheets, the sheets overlaying each other at their cam surfaces and being adapted to slide in parallel paths; a cam mounted to said case and in simultaneous engagement with both cam surfaces; an actuator segment on each cam surface which lies at an angle to the direction of movement of the cam; a hold segment on each cam surface which lies parallel to the direction of movement of the cam; the hold and actuator segments of the two sheets being alternately arranged, so that the cam contacts a hold segment of one sheet and an actuator segment of the other to alternately actuate and hold the two sheets, a hold segment on the masking sheet and an actuator segment on the shield sheet being contacted by the cam in its initial position with the sheets in their first positions, initial movement of the cam moving the shield sheet to its second position while holding the masking sheet in its first position, whereupon the cam engages an actuator segment on the masking sheet and a hold segment on the shield sheet to move the masking sheet to its first position while holding the shield sheet in its second position, and an evaluation device for concurrently checking a student's responses to the instruction material, said instruction material being supplied on a movable program tape and the writing surface being part of a response tape; a lever having an arm beneath the response tape and actuable by contact made through the tape to record an incorrect response; a counter connected to and actuated by said lever to count total lever actuations; a bell crank rotatably mounted in said case and adapted to be incrementally rotated upon actuation of the lever; an arm having one end mounted to the crank arm; a guide receiving the other end of the arm; marking means mounted to said other end and adapted to be moved toward the program tape by actuation of the lever, whereby actuation of the lever causes the marking means to mark the program sheet and causes incremental reciprocation of the marking means across the program tape, the resulting marks being randomly placed laterally of the program tape.

References Cited in the file of this patent

UNITED STATES PATENTS

| | | |
|---|---|---|
| 1,670,480 | Pressey | May 22, 1928 |
| 2,165,613 | Conn | July 11, 1939 |
| 2,715,784 | Genest | Aug. 23, 1955 |
| 2,915,833 | Genest | Dec. 8, 1959 |